United States Patent
Mothaffar

(10) Patent No.: US 8,893,920 B2
(45) Date of Patent: Nov. 25, 2014

(54) VEHICLE TISSUE DISPENSER

(71) Applicant: Hussain Y. A. M. Mothaffar, Al-Rawda (KW)

(72) Inventor: Hussain Y. A. M. Mothaffar, Al-Rawda (KW)

( * ) Notice: Subject to any disclaimer, the term of this patent is extended or adjusted under 35 U.S.C. 154(b) by 276 days.

(21) Appl. No.: 13/652,450

(22) Filed: Oct. 15, 2012

(65) Prior Publication Data
US 2014/0103059 A1    Apr. 17, 2014

(51) Int. Cl.
*A47K 10/42*    (2006.01)

(52) U.S. Cl.
CPC ..................... *A47K 10/42* (2013.01)
USPC ............................ 221/34; 221/102

(58) Field of Classification Search
CPC . A47K 10/426; A47K 10/42; A47K 10/3818; A47K 10/421; B65D 83/0805; B65D 5/0209; B65D 83/00; B65D 83/08; B60N 3/101; B60R 7/084
USPC ............................. 221/34, 102, 49
See application file for complete search history.

(56) References Cited

U.S. PATENT DOCUMENTS

| | | | |
|---|---|---|---|
| 2,592,255 A | 4/1952 | Drees | |
| 2,841,276 A | 7/1958 | Schwimmer et al. | |
| 2,887,216 A | 5/1959 | Hargraves | |
| 3,414,157 A | 12/1968 | Wright | |
| 3,458,095 A | 7/1969 | Stall | |
| 3,606,112 A | 9/1971 | Cheshier | |
| 4,879,442 A | 11/1989 | Giovine | |
| 6,116,672 A | 9/2000 | Cannon et al. | |
| 6,318,590 B1 * | 11/2001 | McMurray-Stivers | 221/45 |
| 7,014,062 B2 * | 3/2006 | Parris et al. | 221/102 |
| 7,490,733 B2 * | 2/2009 | Tagliareni | 221/46 |
| 7,591,498 B2 | 9/2009 | Busha et al. | |
| 8,302,810 B2 * | 11/2012 | Mulhem et al. | 221/102 |
| 8,602,257 B2 * | 12/2013 | Godsell | 221/34 |
| 2003/0189059 A1 | 10/2003 | May et al. | |

FOREIGN PATENT DOCUMENTS

JP    64-37381    2/1989

* cited by examiner

*Primary Examiner* — Timothy Waggoner
(74) *Attorney, Agent, or Firm* — Richard C Litman

(57) ABSTRACT

The vehicle tissue dispenser is a combination tissue dispenser, waste receptacle and air freshener for a vehicle. The vehicle tissue dispenser includes a hollow base portion having a lower end adapted to be received within a vehicle cup holder. An inner annular wall of an upper portion thereof defines an open central portion. The hollow base portion receives waste therein through a waste opening formed through an annular rim. When full, the user may remove the waste from the open central portion. A hollow upper portion includes a base releasably secured to the inner annular wall such that the base of the upper portion releasably covers the open central portion. The hollow upper portion stores tissues, which are removable through a slot formed therein. A hollow cover releasably covers the open upper end of the hollow upper portion. The hollow cover is adapted for receiving an air freshener therein.

20 Claims, 6 Drawing Sheets

US 8,893,920 B2

VEHICLE TISSUE DISPENSER

BACKGROUND OF THE INVENTION

1. Field of the Invention

The present invention relates to receptacles and dispensers, and particularly to a combination tissue dispenser, waste receptacle, and air freshener for a vehicle.

2. Description of the Related Art

Vehicle accessories, such as tissue boxes, tissue dispensers, air fresheners, garbage bags, waste cans and the like, are known. However, such accessories are typically manufactured and sold separately, thus requiring the user to take up substantial amounts of space within the vehicle cabin with a wide variety of different accessories. In addition to taking up space, if one or more accessories are loose, or at least not properly secured, there is an increased chance that a driver may become distracted by reaching for or manipulating one or more of the accessories. It would be desirable to provide common vehicle accessories in a single all-in-one type package, thus maximizing convenience for the user, and minimizing both space and a possible driving hazard.

Thus, a vehicle tissue dispenser solving the aforementioned problems is desired,

SUMMARY OF THE INVENTION

The vehicle tissue dispenser is a combination tissue dispenser, waste receptacle, and air freshener for a vehicle. The vehicle tissue dispenser includes a hollow base portion having upper and lower ends. The lower end is adapted to be received within a vehicle cup holder. The upper end has an outer wall, an inner annular wall, and an annular rim extending therebetween. The inner annular wall defines an open central portion. The hollow base portion is adapted for receiving waste therein through a waste opening formed through the annular rim. When full, the user may remove the waste through the open central portion.

The vehicle tissue dispenser also has a hollow upper portion having at least one sidewall, a base and an open upper end. The base is releasably secured to the inner annular wall of the hollow base portion such that the base of the hollow upper portion releasably covers the open central portion. The hollow upper portion is adapted for storing tissues. The tissues are removable through a slot formed through the at least one sidewall of the hollow upper portion.

A hollow cover has a lower wall, at least one sidewall, and an upper wall. The lower wall releasably covers and seals the open upper end of the hollow upper portion. The hollow cover is adapted for housing an air freshener therein. A plurality of apertures are formed through the upper wall of the cover to release the air freshener's scent.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
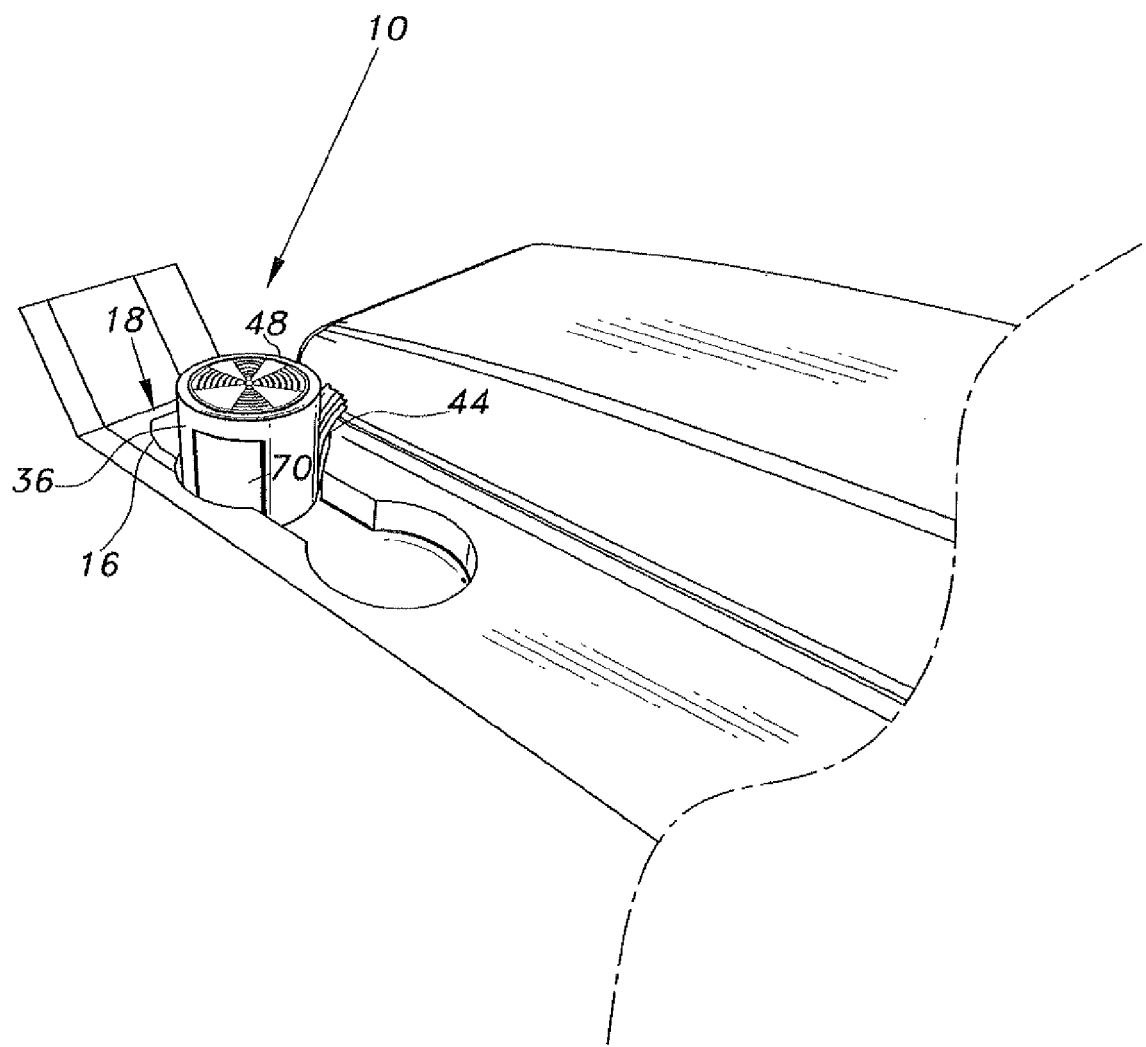
FIG. 1 is an environmental, perspective view of a vehicle tissue dispenser according to the present invention.
Figure 2:
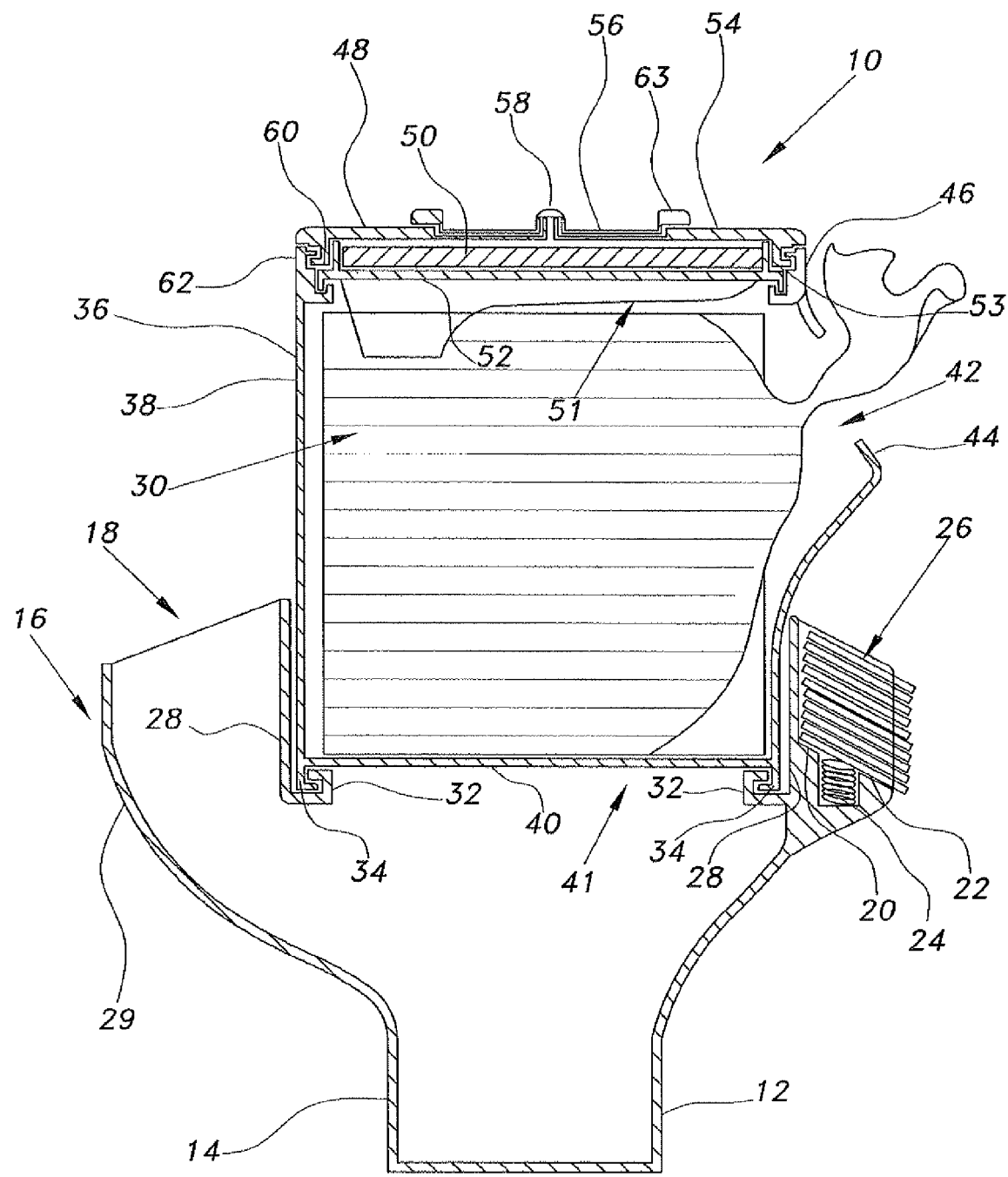
FIG. 2 is a side view in section of the vehicle tissue dispenser of FIG. 1.

Referring to FIGS. 1 and 2, the vehicle tissue dispenser 10 is a combination tissue dispenser, waste receptacle, and air freshener for a vehicle. The vehicle tissue dispenser 10 includes a hollow base portion 12 having lower and upper ends 14, 16, respectively. The lower end 14 is adapted to be received within a vehicle cup holder. It should be understood that cup holder of FIG. 1 is shown for exemplary purposes only, and that the lower end 14 may be dimensioned and configured to be received within any desired type of cup holder or other recess or retainer.

Figure 5:
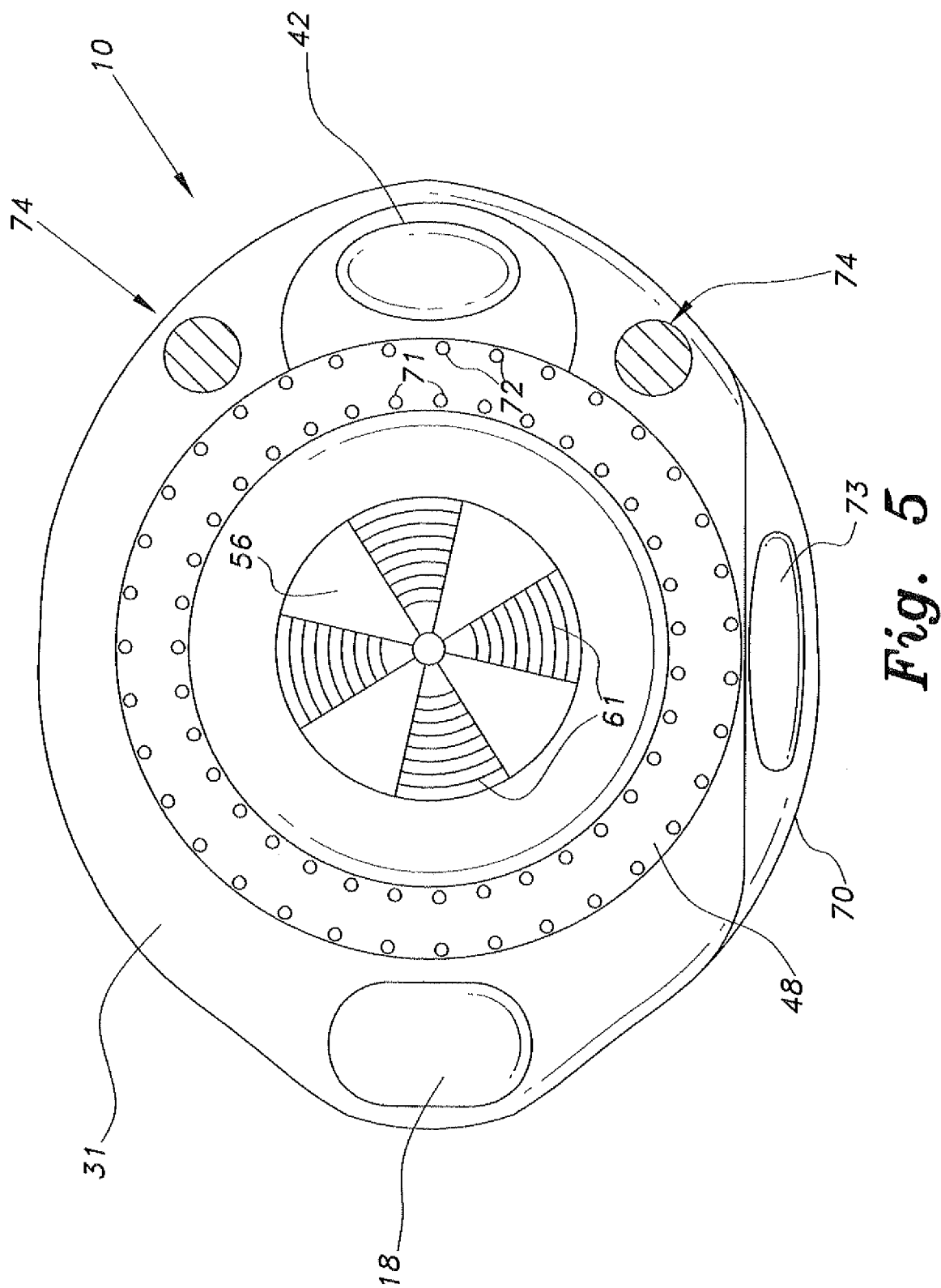
FIG. 5 is a top view of the vehicle tissue dispenser of FIG. 2.

As best shown in FIG. 2, the upper portion 16 of the hollow base portion 12 has an outer wall 29, an inner annular wall 28, and an annular rim 31 extending therebetween (best seen in the top view of FIG. 5). The inner annular wall 28 defines an open central portion 41. The hollow base portion 12 is adapted for receiving waste therein through a waste opening 18 formed through the annular rim 31. When full, the user may remove the waste through the open central portion 41. In FIG. 5, the waste opening 18 is shown as being a substantially oval or elliptical opening formed in the rim 31. It should be understood that the waste opening 18 may have any desired dimensions or configuration.

As best seen in FIG. 2, a coin receptacle 20 may also be defined in the upper portion 16 and annular rim 31 of the hollow base portion 12. A spring-biased platform 22 may be disposed within the coin receptacle 20 for supporting coins 26 thereon. It should be understood that the relative dimensions and configuration of the receptacle 20 are shown for exemplary purposes only in the drawings. Similarly, the compression spring 24 is shown for exemplary purposes only, and it should be understood that any bias member may be used. Although shown as having coin receptacle 20 formed diametrically opposite from the waste opening 18, it should be understood that the coin receptacle 20 may have any desired position on the upper portion 16 of the hollow base portion 12. Further, as shown in FIG. 5, one or more recesses 74 may also be formed in the annular rim 31 and/or the outer wall 29 for receiving pens, pencils or the like.

The vehicle tissue dispenser 10 also has a hollow upper portion 36 having at least one sidewall 38, a base 40 and an open upper end 51. The base 40 is releasably secured to the inner annular wall 28 of the hollow base portion 12 such that the base 40 of the hollow upper portion 36 releasably covers the open central portion 41 of the hollow base portion 12. When the user wishes to remove waste through the open central portion 41, the hollow upper portion 36 is separated from the hollow base portion 12, thus providing access to the waste through the open central portion 41. As shown in FIG. 2, the base 40 of the hollow upper portion 36 and the annular wall 28 of the hollow base portion 12 preferably include complementary locking structures 34, 32, respectively, allowing for releasable snap-type locking between the upper portion 36 and the base portion 12. It should be understood that any suitable type of releasable fastener may be utilized.

The hollow upper portion 36 is adapted for storing tissues 30. The tissues 30 are removable through a slot 42 formed through the at least one sidewall 38. The slot 42 is shown as being formed through an angled, radially extending portion of the sidewall 38, although it should be understood that the sidewall 38 may have any desired configuration. Additionally, although shown as being formed diametrically opposite the waste opening 18, it should be understood that the slot 42 may be formed through any desired portion of the sidewall 38, Further, when sidewall 38 is substantially cylindrical and the locking structures 34, 32 are annular, the upper portion 36 may be rotated with respect to hollow base portion 12, thus allowing for any desired. angular positioning of the slot 42. Further, although shown as having a substantially oval or elliptical configuration in FIG. 5, it should be understood that the slot 42 may have any desired dimensions or configuration.

Figure 4:
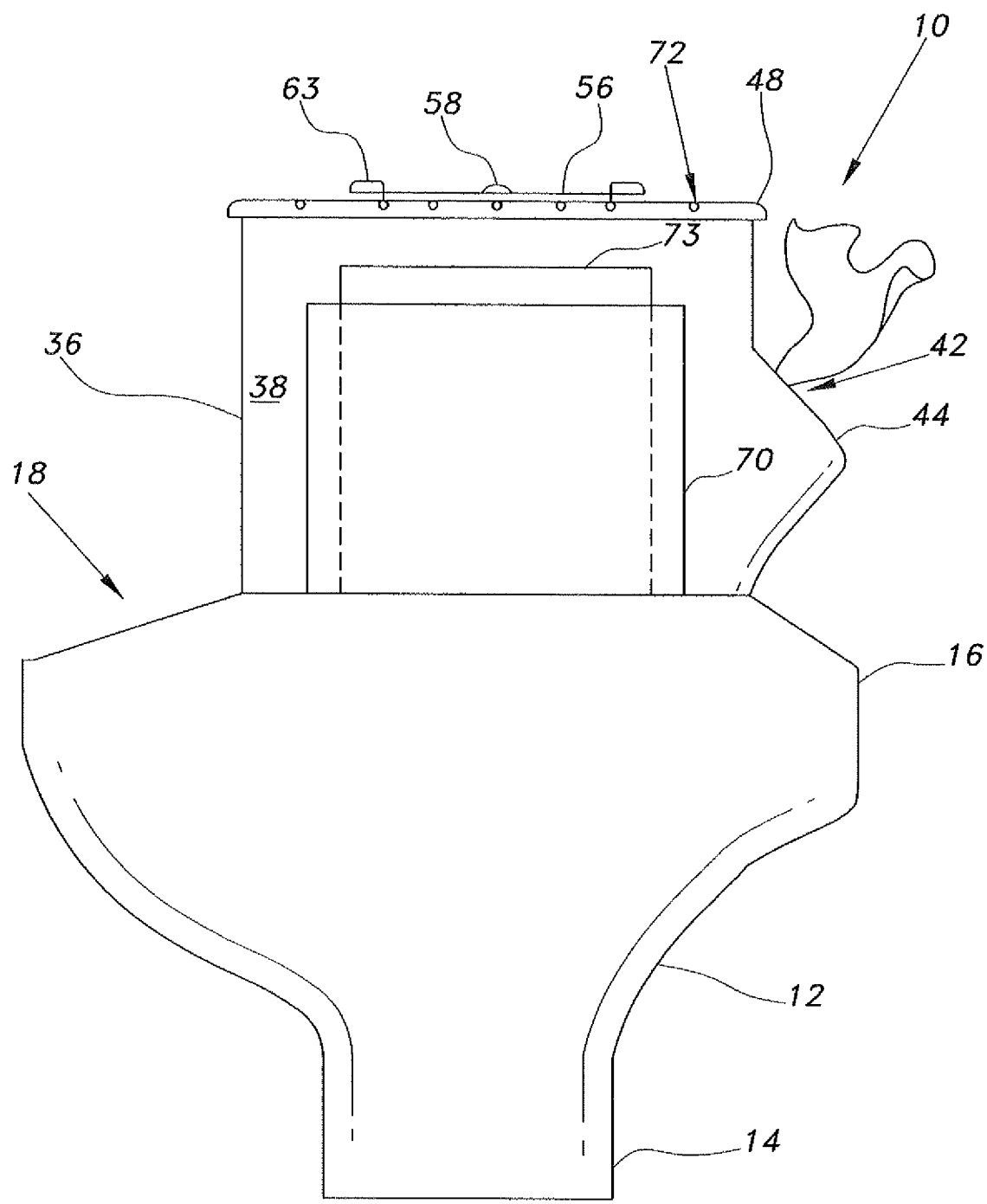
FIG. 4 is a side view of the vehicle tissue dispenser of FIG. 2.

As best shown in FIG. 4, one or more pockets 70 may be secured to the exterior of the sidewall 38 of hollow upper portion 36 for securing a cellular telephone 73 or the like. It should be understood that the cellular telephone 73 is shown for exemplary purposes only, and that the pocket 70 may be dimensioned and configured to receive any desired article. It should be further understood that the pocket 70 may be secured to any desired portion of the upper portion 36 and/or the lower portion 12.

Figure 3:
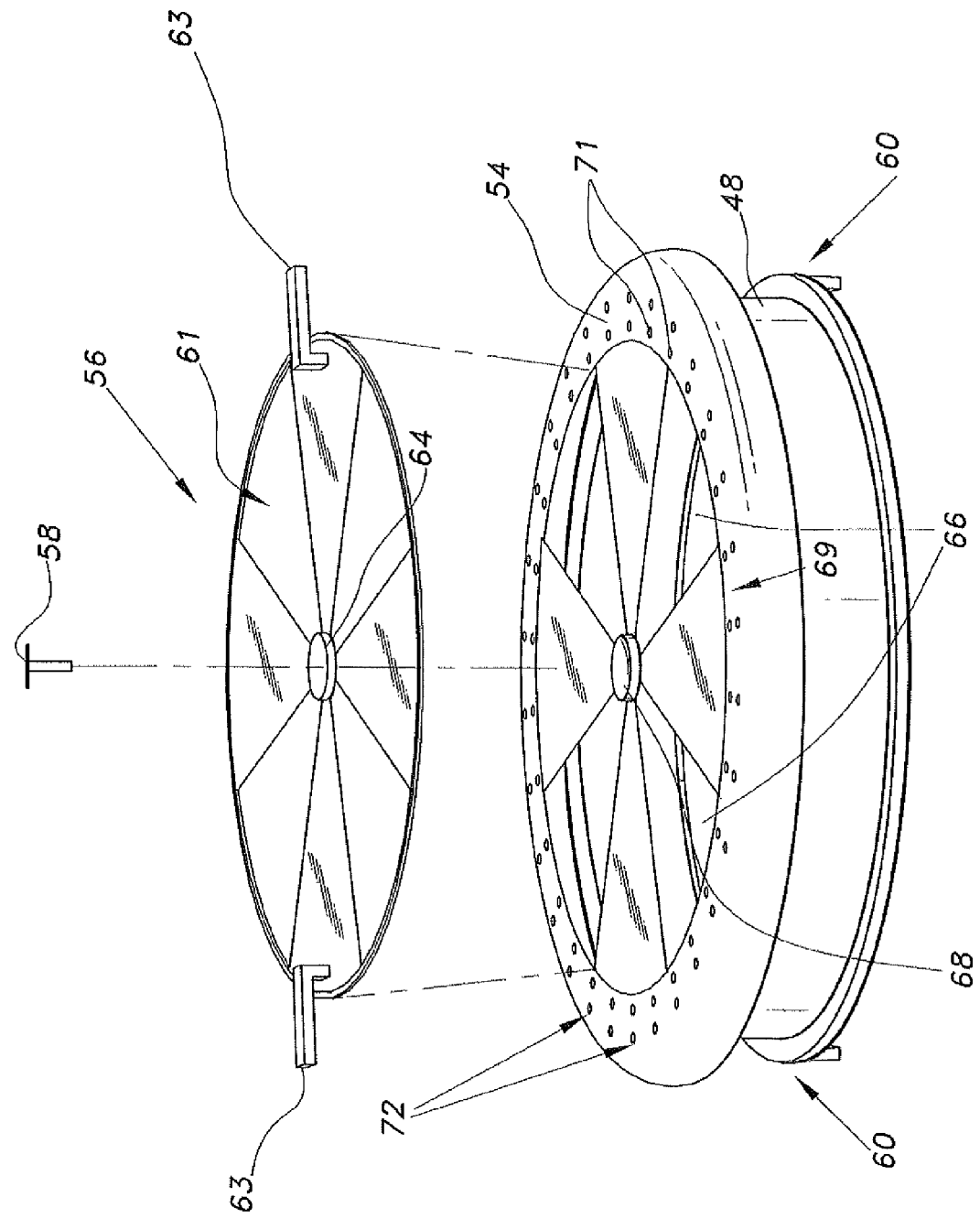
FIG. 3 is a partially exploded perspective view of the cover of the vehicle tissue dispenser of FIG. 2.

As best seen in FIGS. 2 and 3, the vehicle tissue dispenser 10 has a hollow cover 48 having a lower wall 52, at least one sidewall 53, and an upper wall 54. The lower wall 52 releasably covers and seals the open upper end 51 of the hollow upper portion 36. The hollow cover 48 is adapted for receiving an air freshener 50 therein. A plurality of apertures is formed through the upper wall 54 to release a scent of the air freshener 50. It should be understood that any suitable type of air freshener may be used. Preferably, the upper wall 54 is releasably locked to the sidewall 53, allowing for replacement of the air freshener 50 as needed. As shown in FIG. 2, the lower wall 52 and the upper end of upper portion 36 preferably include complementary locking structures 60, 62, respectively, allowing for releasable snap-type locking between the lower wall 52 and the upper end of upper portion 36. It should he understood that any suitable type of releasable fastener may be utilized.

As best shown in FIGS. 3 and 5, the upper wall 54 of the hollow cover 48 has a substantially circular central portion 69 having a plurality of alternating pie-shaped or radial slots 66 formed therethrough for releasing the scent of the air freshener 50. A rotating plate 56 is attached to the substantially circular central portion 69 about a common center. The rotating plate 56 also has a plurality of alternating pie-shaped or radial slots 61 formed therethrough so that the user may rotate the rotating plate 56 to selectively cover or open the alternating radial slots 66 of the substantially circular central portion 69, thus controlling the degree to which the scent of air freshener 50 escapes therethrough. In FIG. 3, an exemplary bolt 58 is shown passing through central opening 64 of the rotating plate 56 and an opening 68 in the upper wall 54 of the hollow cover 48, although it should be understood that any suitable rotatable attachment may be utilized. Further, at least one gripping member 63 is preferably secured to the rotating plate 56, allowing the user to easily rotate plate 56 with respect to the upper wall 54.

As noted above, a plurality of apertures are formed through upper wall 54. Preferably, the apertures include a first set of apertures 71 formed through the upper wall 54 about the substantially circular central portion 69, and a second set of apertures 72 formed peripherally through the upper wall 54, as shown.

Figure 6:
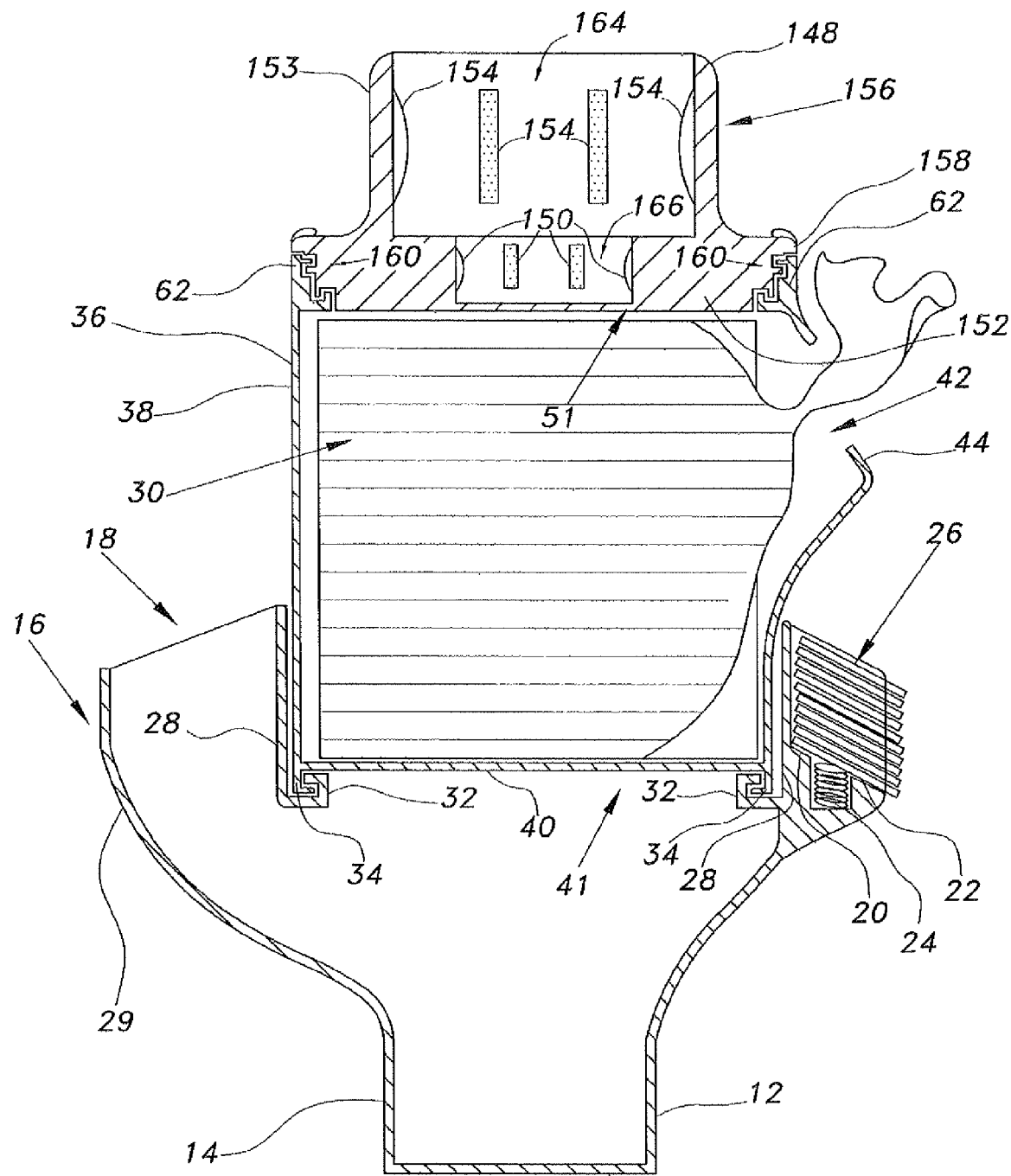
FIG. 6 is a side view in section of an alternative embodiment of a vehicle tissue dispenser according to the present invention.

Further, as noted above, the hollow cover 48 is removable, via engagement between locking structures 60 and 62. The hollow cover 48 may be removed and replaced by any other suitable type of cover. For example, an alternative embodiment of the cover 148, shown in FIG. 6, replaces the air freshener-containing hollow cover 48 with a cover adapted for holding beverage containers. The cover 148 includes an upper portion 156 and a lower portion 158, the lower portion 158 having a lower wall 152 for covering and sealing the open upper end 51, and further providing locking structures 160, similar to locking structures 60, for releasable engagement with locking structures 62. The upper portion 156 of the cover 148 defines a hollow, open cylindrical shell 153 adapted for receiving the lower portion of a conventional beverage cup or the like. As shown in FIG. 6, the open chamber 164 of the upper portion 156 is in communication with a smaller diameter, coaxially positioned chamber or recess 166 defined in the lower portion 158 of the cover 148. The smaller diameter chamber is dimensioned and configured for receiving a smaller diameter beverage container, such as a soda can or the like. Additional gripping elements 154, 150, as shown, may be mounted within the chambers 164, 166, respectively, for retaining the respective containers therein. It should be understood that the dimensions and configuration of the chambers may be varied, depending upon the particular type of container to be received therein.

It is to be understood that the present invention is not limited to the embodiments described above, but encompasses any and all embodiments within the scope of the following claims.

I claim:

1. A vehicle tissue dispenser, comprising:
 a hollow base portion having an upper end and a lower end, the lower end being adapted for placement in a vehicle cup holder, the upper portion having an outer wall, an inner annular wall, and an annular rim extending therebetween, the annular rim having a waste opening formed therein, the inner annular wall defining an open central portion, the hollow base portion being adapted for receiving waste entering through the waste opening formed in the annular rim, the waste collecting in the open central portion;
 a hollow upper portion having at least one sidewall, a base, and an open upper end, the sidewall having a tissue removal slot defined therein, the base of the upper portion being releasably secured to the inner annular wall of the hollow base portion so that the base of the hollow upper portion releasably covers the open central portion, the hollow upper portion being adapted for storing tissues, the tissues being removable through the tissue removal slot formed in the at least one sidewall; and
 a hollow cover having a lower wall, at least one sidewall, and an upper wall, the lower wall releasably covering and sealing the open upper end of the hollow upper portion, the hollow cover being adapted for receiving an air freshener therein, the upper wall having a plurality of apertures defined therein to release air freshener scent.

2. The vehicle tissue dispenser as recited in claim 1, wherein the annular rim of the hollow base portion has a coin receptacle defined therein.

3. The vehicle tissue dispenser as recited in claim 2, further comprising a spring-biased platform disposed within the coin receptacle for supporting coins thereon.

4. The vehicle tissue dispenser as recited in claim 3, wherein the annular rim of the hollow base portion has at least one pen-retaining recess formed therein.

5. The vehicle tissue dispenser as recited in claim 4, wherein the coin receptacle is positioned diametrically opposite the waste opening.

6. The vehicle tissue dispenser as recited in claim 1, further comprising a pocket secured to the at least one sidewall of said hollow upper portion.

7. The vehicle tissue dispenser as recited in claim 1, wherein the upper wall of the hollow cover has a substantially circular central portion, the substantially circular central portion having a plurality of alternating radially extending slots formed therein for releasing the scent of the air freshener.

8. The vehicle tissue dispenser as recited in claim 7, further comprising a plate rotatably attached to the substantially circular central portion, the rotatable plate having a plurality of alternating radial slots formed therein so that the user may rotate the plate to selectively cover or open the alternating radial slots in the substantially circular central portion.

9. The vehicle tissue dispenser as recited in claim 8, further comprising at least one gripping member secured to the rotating plate.

10. The vehicle tissue dispenser as recited in claim 9, wherein said plurality of apertures comprises a first set of apertures formed in the upper wall about the substantially circular central portion.

11. The vehicle tissue dispenser as recited in claim 10, wherein said plurality of apertures further comprises a second set of apertures formed peripherally through the upper wall.

12. A vehicle tissue dispenser, comprising:
a hollow base portion having an upper end and a lower end, the lower end being adapted for placement in a vehicle cup holder, the upper portion having an outer wall, an inner annular wall, and an annular rim extending therebetween, the annular rim having a waste opening defined therein, the inner annular wall defining an open central portion, the hollow base portion being adapted for receiving waste entering through the waste opening formed in the annular rim, the waste collecting in and being removable from the open central portion;
a hollow upper portion having at least one sidewall, a base, and an open upper end, the at least one sidewall having a tissue removal slot defined therein, the base of the hollow upper portion being releasably secured to the inner annular wall of the hollow base portion so that the base of the hollow upper portion releasably covers the open central portion, the hollow upper portion being adapted for storing tissues, the tissues being removable through the tissue removal slot;
a hollow cover having a lower wall, at least one sidewall, and an upper wall, the lower wall releasably covering and sealing the open upper end of the hollow upper portion, the hollow cover being adapted for receiving an air freshener therein, the upper wall of the hollow cover having a plurality of apertures formed therein to release air freshener scent, the upper wall of the cover defining a substantially circular central portion, the substantially circular central portion having a plurality of alternating radially extending slots formed therein for further releasing the scent of the air freshener; and
a plate rotatably attached to the substantially circular central portion, the plate having a plurality of alternating radially extending slots formed therein so that the user may rotate the rotating plate to selectively cover and open the alternating radially extending slots in the substantially circular central portion.

13. The vehicle tissue dispenser as recited in claim 12, wherein the annular rim of the hollow base portion has a coin receptacle defined therein.

14. The vehicle tissue dispenser as recited in claim 13, further comprising a spring-biased platform disposed within the coin receptacle for supporting coins thereon.

15. The vehicle tissue dispenser as recited in claim 14, wherein the annular rim of the hollow base portion has at least one pen-retaining recess formed therein.

16. The vehicle tissue dispenser as recited in claim 15, wherein the coin receptacle is positioned diametrically opposite the waste opening.

17. The vehicle tissue dispenser as recited in claim 12, further comprising a pocket secured to the at least one sidewall of said hollow upper portion.

18. The vehicle tissue dispenser as recited in claim 12, further comprising at least one gripping member attached to the rotating plate.

19. The vehicle tissue dispenser as recited in claim 12, wherein said plurality of apertures comprises a first set of apertures formed in the upper wall about the substantially circular central portion, and a second set of apertures formed peripherally in the upper wall.

20. A vehicle tissue dispenser, comprising:
a hollow base portion having an upper end and a lower end, the lower end being adapted for placement in a vehicle cup holder, the upper portion having an outer wall, an inner annular wall, and an annular rim extending therebetween, the annular rim having a waste opening defined therein, the inner annular wall defining an open central portion, the hollow base portion being adapted for receiving waste inserted through the waste opening, the waste collecting in and being removable from the open central portion;
a hollow upper portion having at least one sidewall, a base, and an open upper end, the at least one sidewall having a tissue removal slot defined therein, the base of the hollow upper portion being releasably secured to the inner annular wall of the hollow base portion so that the base of the hollow upper portion releasably covers the open central portion, the hollow upper portion being adapted for storing tissues, the tissues being removable through the tissue removal slot; and
a cover having an upper portion and a lower portion, the lower portion of the cover including a lower wall for releasably covering and sealing the open upper end of the hollow upper portion, the upper portion of the cover including at least one sidewall defining an open upper chamber adapted for releasably receiving a beverage container having a first diameter, the lower portion of the cover defining an open lower recess in communication with the open upper chamber and being adapted for releasably receiving a beverage container having a second diameter, the second diameter being smaller than the first diameter.

* * * * *